US006306943B1

(12) United States Patent
Henry

(10) Patent No.: US 6,306,943 B1
(45) Date of Patent: Oct. 23, 2001

(54) ZERO VOLITILE ORGANIC SOLVENT COMPOSITIONS

(75) Inventor: Richard G. Henry, Beachwood, OH (US)

(73) Assignee: Polymer Solvents, LLC, Beachwood, OH (US)

(*) Notice: Subject to any disclaimer, the term of this patent is extended or adjusted under 35 U.S.C. 154(b) by 0 days.

(21) Appl. No.: 09/515,948

(22) Filed: Feb. 29, 2000

Related U.S. Application Data

(63) Continuation-in-part of application No. 09/022,779, filed on Feb. 12, 1998, now Pat. No. 6,048,471.
(60) Provisional application No. 60/053,073, filed on Jul. 18, 1997.

(51) Int. Cl.[7] ............................. C08L 23/00; C08K 5/01; C08K 5/02; C08K 5/07; C11D 3/44
(52) U.S. Cl. ..................... 524/270; 524/356; 524/366; 524/379; 524/462; 524/464; 524/484; 510/175; 510/244; 510/365; 252/364
(58) Field of Search ................................. 524/270, 356, 524/366, 379, 462, 464, 484; 510/175, 244, 365

(56) References Cited

U.S. PATENT DOCUMENTS

| | | | |
|---|---|---|---|
| 3,665,034 | 5/1972 | Komatsu et al. | 260/533 A |
| 3,768,232 | 10/1973 | Farber et al. | 55/58 |
| 3,773,676 | 11/1973 | Boyles | 252/171 |
| 3,773,677 | 11/1973 | Boyles | 252/172 |
| 3,884,852 | 5/1975 | Sheppard | 260/17 R |
| 3,888,808 | 6/1975 | Downs et al. | 523/456 |
| 3,893,960 | 7/1975 | Sheppard | 260/23 AR |
| 3,923,912 | 12/1975 | Beckers | 260/652.5 R |
| 3,924,455 | 12/1975 | Begishagen et al. | 73/88 |
| 3,937,665 | 2/1976 | Mammino et al. | 252/162 |
| 3,950,185 | 4/1976 | Toyama et al. | 134/38 |
| 3,966,650 | 6/1976 | Prokai | 521/111 |
| 4,020,216 | 4/1977 | Miller | 428/425 |
| 4,029,616 | 6/1977 | Nakashio et al. | 260/17.4 ST |
| 4,096,083 | 6/1978 | Clementson | 252/171 |
| 4,221,829 | 9/1980 | Vargiu et al. | 427/222 |
| 4,248,636 | 2/1981 | Sasaki et al. | 106/23 |
| 4,260,510 | 4/1981 | Hey et al. | 252/171 |
| 4,268,407 | 5/1981 | Hey et al. | 252/171 |
| 4,280,006 | 7/1981 | Blout | 521/154 |
| 4,317,752 | 3/1982 | Blout | 521/159 |
| 4,337,968 | 7/1982 | Maierson | 503/207 |
| 4,389,503 | 6/1983 | Maxwell et al. | 524/38 |
| 4,414,341 | 11/1983 | Williams | 523/340 |
| 4,423,095 | 12/1983 | Blizzard | 427/387 |
| 4,537,934 | 8/1985 | Fock et al. | 525/123 |
| 4,543,206 | 9/1985 | Adams | 252/557 |
| 4,624,970 | 11/1986 | Dwyer et al. | 521/131 |
| 4,637,958 | 1/1987 | Wegehaupt et al. | 428/416 |
| 4,683,075 | 7/1987 | Wilson et al. | 252/171 |
| 4,814,100 | 3/1989 | Merchant et al. | 252/171 |
| 4,843,170 | 6/1989 | Isshiki et al. | 560/261 |
| 4,898,893 | 2/1990 | Ashida | 521/131 |
| 5,034,154 | 7/1991 | Yezrielev et al. | 252/364 |
| 5,035,833 | 7/1991 | Ogawa et al. | 252/182.24 |
| 5,041,287 | 8/1991 | Driggers et al. | 424/81 |
| 5,051,153 | 9/1991 | Berg | 203/60 |
| 5,072,028 | 12/1991 | Fishler et al. | 560/221 |
| 5,091,104 | 2/1992 | Van Der Puy | 252/171 |
| 5,102,563 | 4/1992 | Desbiendras et al. | 252/171 |
| 5,104,915 | 4/1992 | Paci | 524/32 |
| 5,120,470 | 6/1992 | Ohmure et al. | 252/364 |
| 5,124,063 | 6/1992 | Logsdon et al. | 252/171 |
| 5,242,502 | 9/1993 | Rowe | 134/10 |
| 5,244,507 | 9/1993 | Rowe | 134/38 |
| 5,252,668 | * 10/1993 | Mori et al. . | |
| 5,256,453 | 10/1993 | Heithorn et al. | 427/415 |
| 5,342,865 | 8/1994 | Zwinselman et al. | 523/414 |
| 5,376,717 | 12/1994 | Patel et al. | 524/314 |
| 5,407,977 | 4/1995 | Everett et al. | 523/429 |
| 5,443,762 | 8/1995 | Rowe | 252/364 |
| 5,468,417 | 11/1995 | LeGrow | 252/174.15 |
| 5,480,920 | 1/1996 | Sharma et al. | 523/161 |
| 5,484,546 | 1/1996 | Minor et al. | 252/67 |
| 5,495,040 | 2/1996 | Patel et al. | 560/190 |
| 5,578,137 | 11/1996 | Shealy | 134/42 |
| 5,605,647 | 2/1997 | Nimitz et al. | 252/2 |
| 5,637,139 | 6/1997 | Morelos et al. | 106/31.37 |
| 5,733,472 | 3/1998 | Minor et al. | 252/67 |
| 5,753,727 | * 5/1998 | Sato et al. . | |
| 5,801,136 | 9/1998 | Henry | 510/175 |
| 5,814,595 | 9/1998 | Flynn et al. | 510/411 |
| 5,849,806 | 12/1998 | St. Clair et al. | 521/109.1 |
| 5,916,713 | * 6/1999 | Ochiai et al. . | |
| 6,187,736 | * 2/2001 | Jarema . | |

FOREIGN PATENT DOCUMENTS

| | | |
|---|---|---|
| 8-302316 | 11/1996 | (JP) . |
| 10-279835 | 10/1998 | (JP) . |
| WO 92/09651 | 6/1992 | (WO) . |

OTHER PUBLICATIONS

"Alliance for Responsible Atmospheric Policy," EPA submission document, Sep. 25, 1995.
Hawley's Condensed Chemical Dictionary, 11th Edition, Sax, N. Irving and Richard J. Lewis, 1987.
Wm. P.L. Carter, "Development of Ozone Reactivity Scales for Volatile Organic Compounds," *Journal of the Air and Waste Management Association*, vol. 44, pp. 881–899, Jan. 20, 1994.

* cited by examiner

*Primary Examiner*—Tae H. Yoon
(74) *Attorney, Agent, or Firm*—Fay, Sharpe, Fagan, Minnich & McKee, LLP

(57) ABSTRACT

This invention pertains to the art of solvent blends and solvent/resin blends. More particularly, this invention pertains to blends that reduce the atmospheric reactivity of some high volatile organic compounds. The invention is particularly applicable to solvent blends and solvent/resin blends that combine volatile organic compounds with newly discovered zero volatile organic compounds for use adhesives, coatings, inks, cleaning and blowing agents and the like and will be described with particular reference thereto. However, it will be appreciated that the invention may be advantageously employed in other environments and applications.

35 Claims, No Drawings

ZERO VOLITILE ORGANIC SOLVENT COMPOSITIONS

This application is a continuation-in-part of U.S. application Ser. No. 09/022,779, filed Feb. 12, 1998, now U.S. Pat. No. 6,048,471, which claims the benefit of the filing date of U.S. Provisional Application Serial No. 60/053,073, filed Jul. 18, 1997.

BACKGROUND OF THE INVENTION

This invention pertains to the art of solvent blends and solvent/resin blends. More particularly, this invention pertains to blends that reduce the atmospheric reactivity of some high volatile organic compounds. The invention is particularly applicable to solvent blends and solvent/resin blends that combine volatile organic compounds with newly discovered zero volatile organic compounds for use adhesives, coatings, inks, cleaning and blowing agents and the like and will be described with particular reference thereto. However, it will be appreciated that the invention may be advantageously employed in other environments and applications.

Heretofore, hydrocarbon-based solvents have been used to dissolve organic materials in many industrial applications. However, recently, hydrocarbon-based solvents have fallen out of favor because they have been classified by the United States Environmental Protection Agency and other international regulatory bodies as materials that contribute to the formation of ground based ozone or smog. This has created a need for other types of solvents for the production of coatings, adhesives, inks and the like.

Upon evaporation, a highly-reactive, hydrocarbon-based solvent reacts with hydroxyl radicals and ultraviolet light very close to the ground to form a photochemical smog that is considered harmful and in some cases dangerous. Some cities have severe smog which reduces visibility and actually causes "ozone alerts." In part, the smog is caused by hydrocarbon emissions from cars. However, another major contributor is industrial use of hydrocarbon-based solvents such as hexane and toluene.

For the purpose of ozone excedence in cities throughout the United States, a reactivity based formulation scheme will also be described which will make use of low atmospheric reactivity solvents by themselves or in combination with high reactivity solvents. These solvents and solvent blends can be used to dissolve resins for adhesives, inks and coatings, or used as cleaning agents and in the process reduce the amount of ozone formed in the lower atmosphere.

The benchmark for desired reaction rates of hydrocarbon-based compounds is ethane. If a compound has a reaction rate with the hydroxyl radical and ultraviolet ("UV") light that is faster than ethane, the compound reacts too close to the ground and consequently generates ozone and smog. Such compounds are defined as volatile organic compounds (VOCs). On the other hand, if a compound has a reaction rate that is slower than ethane, the compound reaches higher into the atmosphere before reacting with the hydroxyl radical and UV light. In such instances the non-VOC compound does not contribute to the formation of ground based ozone and smog.

Governmental regulations limit the use of VOCs in coatings, inks, and adhesives. As a result, water-borne coatings have become the most important type of coatings in coating and adhesive systems. However, water-borne coatings must contain some volatile organic compound content. This is because water flashes off too fast from the water-based latex or emulsion to make a good film. To alleviate this problem, 7% to 10% of a slower evaporating solvent such as a glycol ether is added to the latex to aid in film formation. Unfortunately, glycol ethers are primary examples of VOCs and thus dangerous to the environment.

Halogenated hydrocarbon-based compounds have reaction rates that are slower than ethane. However, these halogenated compounds are ozone depleting consequently, they are not suitable VOC-free solvents.

In the prior art, U.S. Pat. No. 5,102,563 to Desbiendras describes a solvent composition which contains methyl tert butyl ether. However, methyl tert butyl ether is a VOC and thus unsafe for the environment. Similarly, U.S. Pat. No. 4,898,893 to Ashida describes a composition for making a blowing agent which contains a flammable aliphatic hydrocarbon. This is also a VOC. U.S. Pat. No. 3,950,185 to Toyama teaches film removing compositions which contain methylene chloride and bromochloromethane which are not VOCs. However, these compositions also contain methanol and monochlorobenzene which are VOCs. U.S. Pat. No. 3,924, 455 to Begishagen describes a formulation containing mineral spirits which removes lacquer stress coatings. These mineral spirits are also VOCs.

Use of a combination of a zero volatile compound with a highly reactive compound or with a low reactivity compound will reduce the overall VOC content of the mixture when used for the applications mentioned. Also, various low reactivity VOC solvents have been identified which when used with resins, will reduce the atmospheric reactivity of the coating, ink or adhesive. The low reactivity solvents can be blended with high reactivity solvents before mixing with a resin to lower the total reactivity of the formulation. Thus, the highly reactive compounds become less reactive than just a subtractive effect in some instances. In other examples, it takes a larger amount of the zero volatile organic compound to give the desired effect of reducing the incremental reactivity of the mixture closer to 0.25, which is the value measured for ethane.

Some highly reactive VOC solvents do not realize the same degree of VOC activity reduction according to the present application as other VOCs. Examples of these are formaldehyde, methyl nitrite, trans-2-butene, and 1,3,5-trimethylbenzene. These compounds are so reactive that addition of a zero VOC compound will have little or no effect on the reactivity of the mixture. A first object of the present invention is to provide a reduction in atmospheric activity of high VOC solvents by adding a zero VOC solvent to the high VOC solvent. An additional aspect to the present invention involves producing environmentally friendly coatings, inks, adhesives, blowing agents and cleaning agents by adding a zero VOC solvent to a high VOC solvent containing coating, ink, adhesive, blowing agent or cleaning agent.

A first object of the invention is to provide a reduction in atmospheric reactivity of high VOC solvents by addition of a low reactivity or zero VOC solvent to the high VOC solvent.

An additional aspect of the present invention involves producing environmentally friendly coatings, inks, adhesives, blowing agents and cleaning agents by adding a zero VOC or low reactivity solvent to a high VOC solvent containing coating, ink, adhesive, blowing agent or cleaning agent.

A further object of the present invention is the identification of some high-performance solvents and solvent/resin blends which are non-flammable or self-extinguishing and do not contribute to the formation of ground-based ozone.

Another object of the present invention are solvents and solvent/resin blends that are safer to the environment than even waterbased systems which still must contain a volatile organic solvent to aid in film formation.

Yet another object of the present invention are environmentally-safer solvent compositions which do not contribute to the formation of ground based ozone which will be useful in the formulation of cleaning agents, coatings, adhesives, inks and also blowing agents for the production of plastic foams.

SUMMARY OF THE INVENTION

The present invention is directed to reduced incremental atmospheric reactivity of volatile organic compound based compositions using zero volatile organic chemical compounds (VOC) and VOC compounds with low atmospheric reactivity which overcome all of the above referenced problems and others and which are economical and effective for their intended uses.

In accordance with a first aspect of the present invention, there is provided a solvent system wherein a high VOC solvent has its atmospheric activity reduced by addition thereto of a low reactivity or zero VOC solvent.

In accordance with a further aspect of the invention, coatings, inks, adhesives, blowing agents and cleaning agents containing VOC solvents are made environmentally friendly through reduction of atmospheric reactivity by addition of a zero VOC or low reactivity VOC solvent to the VOC composition.

In a further aspect of the invention, VOC solvents have their atmospheric reactivity reduced to approach 0.25 (the measured value for ethane) by addition thereto of a low reactivity or zero VOC solvent thereby rendering the VOC solvent composition environmentally friendly.

In accordance with a second aspect of present invention, there is provided a solvent-resin composition having a combination of a zero volatile compound with a highly reactive compound or with a low reactivity compound. The solvent component is about 5% to about 95% by total volume of the solvent-resin composition and is one or more of the zero VOC solvents selected from the group consisting of:

1-bromopropane;
benzotrifluoride;
t-butylacetate;
methyl acetate;
parachlorobenzotrifluoride;
acetone;
1,1,1,2,2,3,3,4,4-nonafluro4-methoxybutane;
1-ethoxy-1,1,2,2,3,3,4,4, 4-nonafluorobutane;
2-(ethoxydifluoromethyl)-1,1,1,2,3,3,3- heptafluropropane;
technical white oils; and,
n-alkane (C12–C18).

In accordance with a more limited aspect of the invention, from about 0.1% by volume to about 98% by volume of the VOC solvents can be blended with the zero VOC solvents to act as a solvent carrier for any of the mentioned resin systems.

A principal advantage of the invention is that the VOC solvents are rendered environmentally safer yet still capable of effectively dissolving resins.

Another advantage of the invention is that it may be used in place of solvents currently used for inks, adhesives, coatings and the like.

Still other advantages and benefits of the invention will become apparent to those skilled in the art upon a reading and understanding of the following detailed description.

DETAILED DESCRIPTION OF THE PREFERRED EMBODIMENTS

The compositions of the present invention are high-performance solvent and solvent-resin blends that have reduced atmospheric reactivity. In addition, compositions which are generally VOC-type are also disclosed. The compositions as herein described and as set forth in the claims are expressed in terms of percentages of volume unless clearly indicated to the contrary.

In describing the compositions of the present invention, reference will be made to certain resin classifications which require a totally VOC-free solvent system to be environmentally safe. These resin classifications are:

a) acrylic-thermoplastic;
b) acrylic-thermosetting;
c) chlorinated rubber;
d) epoxy (either one or two part);
e) hydrocarbon (e.g., olefins, terpene resins, rosin esters, coumaroneindene, styrene-butadiene, styrene, methylstyrene, vinyl-toluene, nitorcellulose, polychloroprene, polyamide, polyvinyl chloride and isobutylene);
f) phenolic;
g) polyester and alkyl;
h) polyurethane;
i) silicone;
j) urea; and,
k) vinyl and vinyl acetate.

It is to be appreciated that this list does not include all resin classifications. Other resin classifications are intended to be encompassed by the scope of the present invention.

Examples of VOC solvents that have their maximum incremental reactivity effected are:

xylene;
toluene;
glycol ethers;
trichloroethylene;
naphthenic solvents;
iso-paraffins;
epoxides;
acetals;
nitroparaffins;
n-methyl pyrollidone;
hexane;
terpene;
dimethyl ether;
esters;
ketones;
ethyl acetate;
alcohols;
paraffins;
oxygenated solvents;
propylene carbonate;
mineral spirits; and,
dibasic esters.

Effective solvents of the present invention which have reaction rates with hydroxyl ion slower than ethane (i.e., <0.25) are:

1) 1-bromopropane;
2) benzotrifluoride;
3) t-butylacetate;
4) methyl acetate;
5) parachlorobenzotrifluoride;
6) acetone;
7) 1,1,1,2,2,3,3,4,4-nonafluro4-methoxybutane;
8) 1-ethoxy-1,1,2,2,3,3,4,4, 4-nonafluorobutane;
9) 2-(ethoxydifluoromethyl)-1,1,1,2,3,3,3-eptafluropropane;
10) technical white oils;
11) n-alkane (C12–C18);
12) chlorobranomethane;
13) perchloroethylene;
14) 1,2 dichloro-1,1,2-trifluoroethane;
15) dimethoxymethane;
16) 2-(difluromethoxymethyl)-1,1,1,2,3,3,3-heptafluoropropane; and
17) methylene chloride;

It is to be appreciated that this list does not include all effective non-VOC solvents. Other effective non-VOC solvents are intended to be encompassed by the scope of the present invention.

Atmospheric reactivity of VOC solvent compositions can be reduced by from about 20% to about 90% upon addition of an effective amount of a zero VOC solvent or a low reactivity VOC solvent. The amount of zero VOC or low reactivity VOC solvent which is effective for reducing the atmospheric reactivity of VOC solvent compositions can range in amounts of from about 0.1% by volume to about 99.9% by volume of the solvent composition.

The type of specific applications (hence the denotation "a" alongside the number identifying the application) for which the solvents and solvent-resin blends of the present invention may be used are as follows:

1a) adhesives
2a) blowing agents
3a) coatings
4a) cleaning compositions
5a) inks The zero VOC solvent and solvent-resin blends of the present invention as well as their applications are set forth in the table below. The table uses the identifiers set out above, i.e., a numeral alone for the solvent and a number followed by a "a" for the application.

| | VOC Compounds (more reactive than ethane) | Maximum Incremental Reactivity (MIR)* | % by volume of Zero VOC compound necessary to reduce reactivity by 20% to 90% | Applications |
|---|---|---|---|---|
| A. | xylene | 6.5–8.2 | 5–98 | 1a–5a |
| B. | n-methyl pyrollidone | 1.25 | 5–98 | 1a–5a |
| C. | Toluene | 2.70 | 5–98 | 1a–5a |
| D. | terpenes | 3–4.4 | 5–98 | 1a–5a |
| E. | Glycol ethers | 0.44 | 10–99.9 | 1a–5a |
| F. | Oxygenated solvents | 0.40–1.40 | 10–99.9 | 1a–5a |
| G. | TCE | 0.75 | 5–98 | 1a–5a |
| H. | dimethyl ether | 0.76 | 10–80 | 1a–5a |
| I. | Napthenic solvents | 2.7 | 5–98 | 1a–5a |
| J. | Dibasic esters | 0.75–1.5 | 5–90 | 1a–5a |
| K. | Paraffins | 0.32–1.6 | 5–95 | 1a–5a |
| L. | Hexane | 0.98 | 5–95 | 1a–5a |
| M. | Isoparafinns | 0.37–1.4 | 5–95 | 1a–5a |
| N. | Ketones | 0.56–1.18 | 5–95 | 1a–5a |
| O. | Epoxides | 0.60–1.30 | 10–99.9 | 1a–5a |
| P. | ethyl acetate | 0.55–1.23 | 5–98 | 1a–5a |
| Q. | Acetals | 0.33 | 30–99.9 | 1a–5a |
| R. | Nitroparaffins | 0.80 | 30–99.9 | 1a–5a |
| S. | Alcohols | 0.42–2.7 | 10–99.9 | 1a–5a |
| | t-butyl alcohol | 1.0 | 10–99.9 | 1a–5a |
| | isopropanol | 0.54 | 10–98 | 1a–5a |
| | n-propyl alcohol | 2.3 | 10–98 | 1a–5a |
| | methanol | 0.56 | 10–98 | 1a–5a |
| | propylene carbonate | 0.75 | 10–98 | 1a–5a |
| | mineral spirits | 0.83–89 | 10–98 | 1a–5a |

*ethane 0.25

A better understanding of the present invention can be had by reference to the following descriptions of embodiments which effectively meet the objectives outlined above.

One preferred embodiment of a reduced reactivity solvent blend is to select a high reactivity solvent (MIR greater than 1), such as toluene, and blend it with a low reactivity solvent (MIR less than 1) such as isopropyl alcohol to reduce the total reactivity of the solvent blend. Though neither compound is VOC exempt, the combination of the two will be safer to the environment. This mixture will be useful in combination with a resin to produce an adhesive, coating or ink. Any high reactivity solvent can be used in place of the toluene.

An embodiment of a reduced reactivity solvent blend is to select a high reactivity solvent (MIR greater than 1) such as toluene, xylene, glycol ethers, hexane or mineral spirits and blend it with a zero VOC solvent such as 1-bromopropane, benzotrifluoride, t-butylacetate, methyl acetate, or acetone to reduce the total reactivity of the solvent blend. This mixture will be useful in combination with a resin to produce an environmentally friendly adhesive, coating, ink or blowing agent having a reduced atmospheric reactivity.

The following examples are intended to be exemplary of the present invention and are not intended to limit the invention of the particular embodiments described therein.

EXAMPLES

The following solvent systems are in accordance with the present invention:

| Example No. | VOC Solvent: Xylene* | Zero VOC Solvent: 1-bromo propane* |
|---|---|---|
| 1 | 30 | 70 |
| 2 | 20 | 80 |
| 3 | 10 | 90 |

*amounts based on percent volume in a 100 g blend.

The solvent blends set forth above are added to 5 to 30 grams hydrocarbon resin such as an olefin, terpene, methacrylate or other tackifier followed by addition of 10 to 35 grams of a polymeric resin such as a styrene-butadiene, acrylic, epoxy, polychloroprene, urethane, natural rubber or styrene. This mixture produces a contact adhesive with excellent bond strength. Any of the above listed VOC solvents mentioned above can be used in place of the xylene.

Another preferred embodiment contains 0.1% to 30% by volume of an epoxide, acetal, nitroparaffin, glycol ether, alcohol or combination thereof and 70% to 99.9% of 1-bromopropane to form a reduced VOC solvent mixture. This mixture is then added to 5% to 35% by weight of a hydrocarbon resin, and 5% to 35% of a styrene-butadiene polymer, a polychloroprene polymer, polyvinyl chloride polymer, natural rubber polymer, acrylic, epoxy, urethane, nitrocellulose or styrene polymer.

Another preferred embodiment of a reduced VOC solvent composition is 100 grams of a mixture containing 5% to 99.9% by volume of either benzotrifluoride, t-butylacetate, methyl acetate or parachlorobenzotrifluoride or a combination thereof and a portion of high VOC solvent mentioned above so that the incremental reactivity of the mixture is reduced closer to the incremental reactivity of ethane (0.25) this mixture can be combined with a resin to produce a coating, ink, adhesive or used as is for a cleaning agent.

An embodiment of a polyurethane foam process using an environmentally safer blowing agent according to the invention is as follows:

1 to 100 parts by weight of a polyol 1 to 50 parts by weight of toluene diisocyanate or methylene diphenylene diisocyanate 2 parts by weight water 0.15 to 0.80 parts catalyst 0.5 to 2 parts surfactant; and 4 to 20 parts acetone or methyl acetate All of the embodiments of the present invention may interchangeably use any of the other non-VOC solvents listed above.

The following embodiments represent zero VOC solvent compositions wherein the solvent consists essentially of the zero VOC solvent.

Solvent and Solvent-resin Compositions Having Zero VOC's

| Main Component | How Used (blends are 5% to 95% or, more preferably, 40% to 95% by vol.) | Resins That Form a Film after Solvent Evaporates | Applications |
|---|---|---|---|
| chlorobromomethane | by itself or blended with any of solvents 2–16 to obtain desired properties | a–k | 1a–5a |
| 1-bromopropane | by itself or blended with solvents 1,3–16 | a–k | 1a, 3a, 5a |
| methyl acetate | blended with solvents 1,2, 4–16 at 10–95% by volume. | a–d, styrene, g,j,k | 1a–5a |
| n-alkane (C12–C18) | by itself or blended with solvents 1–3, 5–16 | e | 1a, 3a, 4a, 5a |
| t-butylacetate | by itself or blended with solvents 1,4, 6–16 | a–d, styrene, g, j, k | 1a, 3a, 4a, 5a |
| perchloroethylene | 1–5,7–16 | a–k | 1a,3a,4a,5a |
| benzotrifluoride | 1–6, 8–16 | a–k | 1a,3a,4a,5a |
| parachlorobenzo-trifluoride | 1–7, 9–16 | a–k | 1a,3a,4a,5a |
| acetone | 1–5,7–16 | a, b, e–h, k | 1a–5a |
| 1,2-dichloro-1,1,2-trifluoroethane | 1–9, 11–16 | a, k | 1a–5a |
| dimethoxymethane | 1–3,7–10, 12–16 | a | 1a–5a |
| 1,1,1,2,2,3,3,4,4-nonafluoro-4-methoxy-butane | 1–11, 13,15 | a | 2a, 4a |
| 2-(difluoro-methoxymethyl)-1,1,1,2,3,3,3-heptafluoropropane | 1–12, 14,15 | a | 2a, 4a |
| 1-ethoxy-1,1,2,2,3,3,4,4,4-nonafluorobutane | 1–13, 15 | a | 2a,4a |
| 2-(ethoxy-difluoromethyl)-1,1,1,2,3,3,3-heptafluoropropane | 1–4 | a | 2a,4a |
| methylene chloride | 2–15 | a–k | 1a–5a |
| technical white oils (mineral) | 1–16 | a,e,g | 5a |

A better understanding of the present invention can be had by reference to the following descriptions of embodiments which effectively meet the objectives outlined above.

One preferred embodiment includes mixing one or more of the polymeric resins:

acrylic-thermoplastic;

acrylic-thermosetting;

chlorinated rubber;

epoxy resin;

hydrocarbon (e.g., olefins, terpene resins, rosin esters, coumarone-indene, styrene-butadiene, styrene, methyl-styrene, vinyl-toluene, nitrocellulose, polychloroprene, polyamide, polyvinyl chloride and isobutylene);

phenolic;

polyester and/or alkyd;

polyurethane;

silicone;

urea; and/or vinyl or vinyl acetate, with 10–90%, by total volume of the composition, of one or more of non-VOC solvents such as:

chlorobromomethane;

1-bromopropane;

methyl acetate;

n-alkane (C12–C18);

t-butylacetate;

perchloroethylene;

benzotrifluoride;

parachlorobenzotrifluoride;

acetone;

1,2-dichloro-1,1,2-trifluoroethane;

dimethoxymethane; and/or methylene chloride.

The individual solvents or blends thereof are added until all of the resin(s) is dissolved.

In an embodiment for coatings and/or adhesives, the mixture preferably has a high resin content, i.e., a resin content of 20% to 60% by volume. In another embodiment for inks, the mixture preferably contains a lower concentration of the resin, i.e., 5% to 30% by volume. In yet another embodiment, various pigments or additives are added to achieve a desired range of properties.

In another preferred embodiment of the present invention, 5% to 90% methyl acetate, by total volume of the composition, is added to 10% to 95% of a solvent or solvent blend selected from the group:
chlorobromomethane;
1-bromopropane;
n-alkane (C12–C18);
t-butylacetate;
perchloroethylene;
benzotrifluoride;
parachlorobenzotrifluoride;
acetone;
1,2-dichloro-1,1,2-trifluoroethane;
dimethoxymethane;
1,1,1,2,2,3,3,4,4-nonafluoro-4-methoxy-butane;
2-difluoromethoxymethyl)-1,1,1,2,3,3,3-heptafluoropropane;
1-ethoxy-1,1,2,2,3,3,4,4,4-nonafluorobutane; and,
2-(ethoxydifluoromethyl)-1,1,1,2,3,3,3-heptafluoropropane.

These formulations are used as a cleaning composition for the removal of hydrocarbon or ionic contaminates from circuit boards or in the formulation of coatings, inks, or adhesives. Of course, the formulations may be used for other applications as well.

The following enumerated embodiments have the ability to dissolve resins for the production of coatings, adhesives, and inks as well. In addition, the embodiments are equally useful as cleaning formulations. The ranges for the embodiments are expressed in % by volume of the total solvent-resin composition or, alternatively, the total solvent composition of an initially non-resin containing solvent, such as a cleaning composition. The embodiments are:

(1) 10% to 90% benzotrifluoride and 10–90% of one or more of the solvents:
(a) 1,1,1,2,2,3,3,4,4-nonafluoro-4-methoxy-butane;
(b) 2-(difluoromethoxymethyl)-1,1,1,2,3,3,3-heptafluoropropane;
(c) 1-ethoxy-1,1,2,2,3,3,4,4,4-nonafluorobutane;
(d) 2-(ethoxydifluoromethyl)-1,1,1,2,3,3,3-heptafluoropropane;
(e) perchloroethylene;
(f) 1-bromopropane;
(g) acetone;
(h) n-alkane (C12–C16);
(i) t-buytl acetate (C12–C16); and,
(j) parachlorobenzotrifluoride;

(2) 5% to 20% benzotrifluoride and 80% to 95% 1-bromopropane;

(3) 10% to 90% acetone and 10–90% n-alkane (C12–C18);

(4) 10% to 90% 1-bromopropane and 10% to 90% of one or more of:
(a) chlorobromomethane; and,
(b) n-alkane (C12–C18);

(5) 10% to 90% parachlorobenzotrifluoride and 10% to 90% of one or more of:
(a) 1-bromopropane;
(b) chlorobromomethane;
(c) t-butylacetate; and,
(d) n-alkane (C12–C18);

(6) 10% to 90% 1,2-dichloro-1,1,1-trifluoroethane and 10% to 90% of one or more of:
1,1,1,2,2,3,3,4,4-nonafluoro4-methoxy-butane;
2-(difluoromethoxymethyl)- 1,1,1,2,3,3,3-heptafluoropropane;
1-ethoxy-1,1,2,2,3,3,4,4,4-nonafluorobutane; and,
2-(ethoxydifluoromethyl)-1,1,1,2,3,3,3-heptafluoropropane;
1-bromopropane
acetone;
benzotrifluoride; and,
methyl acetate.

Analogously, the following VOC-free embodiment has the ability to dissolve resins for the production of coatings, adhesives, and inks as well. In addition, the embodiment is equally useful in cleaning formulations:

(1) 10% to 90% methylene chloride and 10% to 90% of one or more of the following solvents:
chlorobromomethane;
1-bromopropane;
methyl acetate;
n-alkane (C12–C18);
t-butylacetate;
perchloroethylene;
benzotrifluoride;
parachlorobenzotrifluoride;
acetone;
1,2-dichloro-1,1,2-trifluoroethane; and,
dimethoxymethane.

An added benefit to mixing methylene chloride with other solvents is the reduction in the overall toxicity of methylene chloride.

Other preferred solvent-resin compositions include VOC-free solvents which have the ability to dissolve resins for the production of coatings, adhesives, and inks. The compositions include any of the above-listed resins and the following solvent mixtures, which are expressed in terms of % by volume of the solvent-resin composition:

(1) 1% to 20% technical white oil and 10% to 90% n-alkane (C12–C18);
(2) 1% to 20% technical white oil and 10% to 90% methyl acetate;
(3) 1% to 20% technical white oil and 10% to 90% t-butylacetate;
(4) 1% to 20% technical white oil and 10% to 90% benzotrifluoride;
(5) 1% to 20% technical white oil and 10% to 90% acetone;
(6) 1% to 20% technical white oil and 10% to 90% parachlorobenzotrifluoride;
(7) 1% to 20% technical white oil and 10% to 90% parachlorobenzotrifluoride;
(8) 1% to 20% technical white oil and 10% to 90% perchloroethylene;
(9) 1% to 20% technical white oil and 10% to 90% methylene chloride; and,
(10) 1% to 20% technical white oil and 10% to 90% of a mixture of methylene chloride, acetone, t-butylacetate, methyl acetate and perchloroethylene.

The following VOC-free embodiment, expressed in terms of % by volume of total composition, is useful as an environmentally-safer blowing agent composition for the production of polyurethane or isocyanurate foams:

99% to 99.98% 1,2-dichloro-1,1,1-trifluoroethane and 0.01% to 0.5% alpha-methyl styrene to inhibit polymerization.

In addition this embodiment has the ability to dissolve resins for the production of coatings, adhesives, and inks, and is useful in cleaning formulations.

Another embodiment which is useful in an environmentally-safer urethane blowing production process comprises using a zero VOC blowing agent composition comprising:

100 parts by weight polyether triol;

50 parts by weight toluene diisocyanate or toluene diocyanurate;

2 parts by weight water;

0.15 parts catalyst;

0.5 to 2 parts surfactant; and, 4 to 10 parts 1-bromopropane or chlorobromomethane.

Still another embodiment which is useful in a urethane production process comprises an environmentally-safer blowing agent composition, wherein the composition comprises, in terms of percent by weight of the total composition (including catalyst and surfactant):

50% to 70% polyether triol;

20% to 40% toluene diisocyanate or toluene disocyanurate;

0% to 10% water;

0% to 5% catalyst;

0% to 5% surfactant;

2% to 15% 1-bromopropane or chlorobromomethane.

The appropriate catalysts and surfactants are selected from those known in the art.

A more limited embodiment which is useful in a urethane production process comprises an environmentally-safer blowing agent composition, wherein the composition comprises, in terms of percent by weight of the total composition (including catalyst and surfactant):

60% to 65% polyether triol;

30% to 33% toluene diisocyanate or toluene disocyanurate;

1% to 2% water;

0.09% to 2% catalyst;

0.3% to 1.5% surfactant; and, 2.4% to 6.1% 1-bromopropane or chlorobromomethane.

This composition is useful for the manufacture of, for example, a flexible furniture grade foam with a density of 0.024 gcm$^3$.

An embodiment of a zero VOC adhesive is 350 grams of 1-bromopropane and/or benzotriflouride to which is added 30% to 50% by weight of a hydrocarbon resin, preferably an olefin, rosin ester or terpene resin, which acts as a tackifier. Then, 100 grams of styrene-butadiene polymer, polychloroprene polymer, polyvinyl chloride polymer, acrylic, epoxy, urethane, nitrocellulose, or styrene is added to the mixture. This mixture produces a contact adhesive with excellent bond strength. Another preferred embodiment of this mixture contains approximately 40% to 90%, volume, of 1-bromopropane and/or benzotriflouride, 5% to 35% of a hydrocarbon resin, and 5% to 25% of styrene-butadiene polymer, polychloroprene polymer, polyvinyl chloride polymer, acrylic, epoxy, urethane, nitrocellulose, or styrene.

Another zero VOC adhesive starts with 100 grams of 1-bromopropane and/or benzotrifluoride. Then, 10 to 100 grams of styrene-butadiene, polychloroprene, polyvinyl chloride, acrylic, epoxy, urethane, nitrocellulose, or styrene polymer or resin is added. This also produces a contact adhesive with excellent bond strength. It is appreciated that other additives may be used to improve wetting and defoaming although they are not always required. Another preferred embodiment of this mixture contains approximately 40% to 95%, by volume, of 1-bromopropane and/or benzotriflouride, and 5% to 60% of styrene-butadiene, polychloroprene, polyvinyl chloride, acrylic, epoxy, urethane, nitrocellulose, or styrene polymer or resin. Still another preferred embodiment of this mixture contains approximately 70% to 95%, by volume, of 1-bromopropane and/or benzotriflouride, and 5% to 30% of styrene-butadiene, polychloroprene, polyvinyl chloride, acrylic, epoxy, urethane, nitrocellulose, or styrene polymer or resin.

Still another embodiment of a zero VOC adhesive starts with 350 g 1-bromopropane and/or benzotriflouride. Then, 20 to 100 grams of styrene butadiene rubber is added. Optionally, 5% to 10%, by volume, acetone is added to improve solubility if necessary. Another preferred embodiment of this mixture contains approximately 50% to 90%, by volume, of 1-bromopropane, and 10% to 30% of acrylic polymer or urethane polymer. Optionally, 5% to 10%, by volume, acetone is added to improve solubility if necessary.

The following VOC-free embodiment has the ability to dissolve resins for the production of coatings, adhesives, and inks as well. Further, the solvent includes stabilizers to stabilize against attack on aluminum. In addition, the embodiment is useful in cleaning formulations:

70% to 90%, by volume, 1,2-dichloro-1,1,1-trifluoroethane;

9% to 29% dimethoxymethane; and 0.5% butylene oxide and 0.5% nitromethane to stabilize against attack on aluminum. Optionally, 5% to 10%, by volume, acetone is added to the total composition to improve solubility if necessary.

All of the embodiments of the present invention may interchangeably use any of the other non-VOC solvents listed above.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

The invention has been described with reference to the preferred embodiments. Obviously, modifications and alterations will occur to others upon a reading and understanding of this specification. It is intended to include all such modifications and alterations insofar as they come within the scope of the appended claims or the equivalence thereof.

What is claimed is:

1. A solvent-resin composition having reduced atmospheric reactivity, the composition consisting essentially of a resin component and a solvent component, the solvent component being 5% to 95% by total volume of the solvent-resin composition, the solvent component comprising a blend of from about 0.1% to about 99.9% by volume of a zero volatile organic compound (VOC) solvent selected from the group consisting of:

1) 1-bromopropane;

2) benzotrifluoride; and 3) t-butylacetate;

blended with from about 0.1% to about 99.9% by volume of a reactive VOC solvent selected from the group consisting of:

xylene;

toluene;
n-methyl pyrollidone;
hexane;
oxygenated solvents;
propylene carbonate;
glycol ethers;
trichloroethylene;
naphthenic solvents;
iso-paraffins;
epoxides;
acetals;
nitroparaffins;
terpene;
dimethyl ether;
esters;
ketones;
ethyl acetate;
alcohols;
paraffins;
mineral spirits;
dibasic esters;
cycloalkanes; and
cycloalkene.

2. The composition according to claim 1 wherein the solvent component is present in the amount of from about 10% to about 95% by total volume of the composition.

3. The composition according to claim 2 wherein the solvent component is present in the amount of from about 30% to about 80% by total volume of the composition.

4. An adhesive resin-solvent composition comprising:
   40% to 90%, by total volume of the composition, of a solvent composition comprising one or more zero VOC solvents selected from the group consisting of 1-bromopropane, benzotrifluoride and t-butylacetate, and a volatile organic compound (VOC) solvent,
   5% to 35% of a tackifier, and
   5% to 40% of a resin, said resin comprising at least one component selected from the group consisting of styrene-butadiene, polychloroprene, polyvinyl chloride, acrylic, epoxy, urethane, nitrocellulose, and styrene.

5. The adhesive resin-solvent composition of claim 4, wherein, the zero VOC solvent is benzotrifluoride.

6. The adhesive resin-solvent composition of claim 4 wherein the zero VOC solvent is 1-bromopropane.

7. The adhesive resin-solvent composition of claim 4 wherein the zero VOC solvent is t-butylacetate.

8. A coating or ink resin-solvent composition comprising:
   10% to 90%, by total volume of the composition, of a solvent composition comprising a zero VOC solvent selected from the group consisting of t-butylacetate, 1-bromopropane, benzotrifluoride, and a VOC solvent, and
   5% to 75% of a polymeric or hydrocarbon resin.

9. The coating or ink resin-solvent composition of claim 8 wherein the zero VOC solvent is t-butylacetate.

10. The coating or ink resin solvent composition of claim 8 wherein the zero VOC solvent is 1-bromopropane.

11. The coating or ink resin solvent composition of claim 8 wherein the zero VOC solvent is benzotrifluoride.

12. An environmentally friendly adhesive, coating or ink solvent-resin composition comprising a solvent composition, said solvent composition comprising a high reactivity solvent (MIR greater than 1) and a low reactivity solvent (MIR less than 1) selected from the group consisting of 1-bromopropane, benzotrifluoride and t-butyl acetate, said low reactivity solvent being present in an amount effective to reduce the total reactivity of the solvent blend, said solvent composition being present in an amount of from about 10% to about 90% by volume of the solvent-resin, further wherein the solvent resin composition comprises a polymeric or hydrocarbon resin, thereby producing an environmentally friendly adhesive, coating or ink composition.

13. The composition according to claim 12 consisting essentially of from about 10% to about 90% by volume of a low reactivity solvent (MIR less than 1) and about 5% to 45% of a polymeric or hydrocarbon resin.

14. An adhesive resin-solvent composition comprising:
   40% to 90%, by total volume of the composition, of one or more zero VOC solvents selected from the group consisting of:
   1-bromopropane;
   benzotrifluoride; and
   t-butylacetate;
   5% to 35% of a hydrocarbon resin as a tackifier, and
   5% to 40% of a resin, said resin comprising at least one component selected from the group consisting of styrene-butadiene, polychloroprene, polyvinyl chloride, acrylic, epoxy, urethane, nitrocellulose, and styrene polymer.

15. A coating or ink resin-solvent composition comprising:
   10% to 90%, by total volume of the composition, of one or more zero VOC solvents selected from the group consisting of:
   1-bromopropane;
   benzotrifluoride; and
   t-butylacetate;
   a VOC solvent; and
   5% to 75% of a polymeric or hydrocarbon resin.

16. A method for reducing the atmospheric reactivity of a solvent-resin composition, wherein the solvent-resin composition comprises from about 5% to about 95%, by total volume of the composition, of a solvent component, said solvent component comprising a reactive VOC solvent selected from the group consisting of:
   xylene;
   toluene;
   n-methyl pyrollidone;
   hexane;
   oxygenated solvents;
   propylene carbonate;
   glycol ethers;
   trichloroethylene;
   naphthenic solvents;
   iso-paraffins;
   epoxides;
   acetals;
   nitroparaffins;
   terpene;
   dimethyl ether;
   esters;
   ketones;
   ethyl acetate;
   alcohols;

paraffins;
mineral spirits;
dibasic esters;
cycloalkanes; and
cycloalkene,
wherein said solvent-resin composition has its atmospheric activity reduced by substituting from about 0.1% to about 99.9% of the reactive VOC solvent with a zero VOC solvent selected from the group consisting of:
 1) 1-bromopropane;
 2) benzotrifluoride; and
 3) t-butylacetate.

17. The method of claim 16 wherein the resin is selected from the group consisting of adhesive resins, coating resins, ink resins, and blowing agent resins.

18. The method according to claim 16 wherein the solvent component is present in the amount of from about 10% to about 95% by total volume of the composition.

19. The method according to claim 16 wherein the solvent component is present in the amount of from about 30% to about 80% by total volume of the composition.

20. A method for reducing the atmospheric reactivity of a cleaning agent comprising a solvent composition wherein the solvent composition comprises from about 5% to about 95%, by total volume of the composition, of a solvent component, said solvent component comprising a reactive VOC solvent selected from the group consisting of:
 1) xylene,
 2) toluene,
 3) n-methyl pyrollidone,
 4) hexane,
 5) oxygenated solvents,
 6) propylene carbonate,
 7) glycol ethers,
 8) trichloroethylene,
 9) naphthenic solvents,
 10) iso-paraffins,
 11) epoxides,
 12) acetals,
 13) nitroparaffins,
 14) terpene,
 15) dimethyl ether,
 16) esters,
 17) ketones,
 18) ethyl acetate,
 19) alcohols,
 20) paraffins,
 21) mineral spirits,
 22) dibasic esters,
 20) cycloalkanes and
 24) cycloalkenes;
further, wherein said cleaning agent composition has its atmospheric reactivity reduced by substituting from about 0.1% to about 99.9% of the reactive VOC solvent with a zero VOC wherein the zero VOC solvent is t-butyl acetate.

21. A method according to claim 20 wherein the VOC solvent is mineral spirits.

22. A method according to claim 20 wherein the VOC solvent is naphthenic solvents.

23. A method according to claim 20 wherein the VOC solvent is glycol ethers.

24. A method according to claim 20 wherein the VOC solvent is alcohols.

25. A method according to claim 20 wherein the VOC solvent is cycloalkanes.

26. A method according to claim 20 wherein the VOC solvent is esters.

27. A method according to claim 20 wherein the VOC solvent is terpene.

28. The method of claim 20 wherein the VOC solvent is toluene.

29. The method of claim 20 wherein the VOC solvent is a ketone.

30. The method of claim 20 wherein the VOC solvent is N-methyl pyrrolidone.

31. The composition of claim 1 wherein the zero VOC solvent is t-butyl acetate.

32. The composition of claim 31 wherein the VOC solvent is toluene.

33. The composition of claim 31 wherein the VOC solvent is a ketone.

34. The composition of claim 31 wherein the VOC solvent is N-methyl pyrrolidone.

35. A cleaning agent composition having a reduced atmospheric reactivity comprising from about 5% to about 95% of a solvent component by total volume of the composition, said solvent component comprising from about 0.1% to 99.9% by volume t-butyl acetate and from about 99.9% to about 0.1% by volume of a VOC solvent selected from the group consisting of:
 1) mineral spirits,
 2) naphthenic solvents,
 3) glycol ethers,
 4) alcohols,
 5) cycloalkanes,
 6) esters,
 7) terpenes,
 8) ketones,
 9) toluene and
 10) N-methyl pyrrolidone.

* * * * *

(12) INTER PARTES REEXAMINATION CERTIFICATE (0053rd)
United States Patent
Henry

(10) Number: US 6,306,943 C1
(45) Certificate Issued: Mar. 24, 2009

(54) ZERO VOLATILE ORGANIC SOLVENT COMPOSITIONS

(75) Inventor: Richard G. Henry, Beachwood, OH (US)

(73) Assignee: Polymer Solvents LLC, Beachwood, OH (US)

Reexamination Request:
No. 95/000,367, May 9, 2008

Reexamination Certificate for:
Patent No.: 6,306,943
Issued: Oct. 23, 2001
Appl. No.: 09/515,948
Filed: Feb. 29, 2000

Related U.S. Application Data

(63) Continuation-in-part of application No. 09/022,779, filed on Feb. 12, 1998, now Pat. No. 6,048,471.
(60) Provisional application No. 60/053,073, filed on Jul. 18, 1997.

(51) Int. Cl.
| C08G 18/00 | (2006.01) |
| C08G 18/08 | (2006.01) |
| C09D 11/02 | (2006.01) |
| C09D 7/00  | (2006.01) |
| C08J 3/02  | (2006.01) |
| C08J 3/09  | (2006.01) |

(52) U.S. Cl. ............ 524/270; 252/364; 510/175; 510/244; 510/365; 524/356; 524/366; 524/379; 524/462; 524/464; 524/484

(58) Field of Classification Search ............ None
See application file for complete search history.

(56) References Cited

U.S. PATENT DOCUMENTS

| 4,080,319 A | 3/1978 | Caporiccio et al. |
| 4,248,636 A | 2/1981 | Sasaki |
| 4,578,209 A | 3/1986 | Hisamoto |
| 4,695,488 A | 9/1987 | Hisamoto |
| 5,073,422 A | 12/1991 | Konno |
| 5,342,716 A | 8/1994 | Kato |
| 5,459,499 A | 10/1995 | Senge |
| 5,827,812 A | 10/1998 | Flynn |
| 6,015,871 A | 1/2000 | Jamasbi |
| 6,048,471 A | * 4/2000 | Henry .................. 252/364 |

FOREIGN PATENT DOCUMENTS

| WO | WO-98/42774 | 10/1998 |
| WO | WO-99/06452 | 2/1999 |

OTHER PUBLICATIONS

U.S. Environmental Protection Agency; "Photochemical Reactivity Workshop"; May 12–14, 1998; Durham NC.
Federal Register; Sep. 11, 1998; pp. 48848–48886; vol. 63; No. 176.
Federal Register; Jul. 8, 1977; pp. 35314–35316; vol. 42; No. 131.
Code of Federal Regulations; Jul. 1, 1997; parts 50–51; vol. 40.
Hare, Clive H.; "Protective Coatings Fundamentals of Chemistry and Composition"; 1994; Technology Publishing Company, Chapter 28, pp. 395–401.
Wicks/Jones/Pappas; "Organic Coatings: Science and Technology vol. 2: Applications, Properties, and Performance"; 1994; John Wiley & Sons, p. 202.

* cited by examiner

*Primary Examiner*—Alan Diamond

(57) ABSTRACT

This invention pertains to the art of solvent blends and solvent/resin blends. More particularly, this invention pertains to blends that reduce the atmospheric reactivity of some high volatile organic compounds. The invention is particularly applicable to solvent blends and solvent/resin blends that combine volatile organic compounds with newly discovered zero volatile organic compounds for use adhesives, coatings, inks, cleaning and blowing agents and the like and will be described with particular reference thereto. However, it will be appreciated that the invention may be advantageously employed in other environments and applications.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–35 are cancelled.

\* \* \* \* \*